(12) United States Patent
Kurth

(10) Patent No.: US 6,913,264 B2
(45) Date of Patent: Jul. 5, 2005

(54) SEALING ARRANGEMENT

(75) Inventor: Jürgen Kurth, Odenthal (DE)

(73) Assignee: AB SKF, Gothenburg (SE)

( * ) Notice: Subject to any disclaimer, the term of this patent is extended or adjusted under 35 U.S.C. 154(b) by 0 days.

(21) Appl. No.: 10/236,910

(22) Filed: Sep. 9, 2002

(65) Prior Publication Data
US 2004/0046331 A1 Mar. 11, 2004

(30) Foreign Application Priority Data
Aug. 21, 2001 (DE) .......................................... 101 40 837

(51) Int. Cl.$^7$ .............................................. F16J 15/32
(52) U.S. Cl. ......................... 277/353; 277/549; 277/572
(58) Field of Search ................................ 277/549, 551, 277/560, 571, 572, 573, 574, 345, 346, 353

(56) References Cited

U.S. PATENT DOCUMENTS

| | | | | |
|---|---|---|---|---|
| 3,156,474 A | * | 11/1964 | Nelson .......................... | 277/571 |
| 3,561,770 A | * | 2/1971 | Corsi et al. ................... | 277/562 |
| 4,239,243 A | * | 12/1980 | Bainard et al. ................ | 277/559 |
| 4,243,235 A | * | 1/1981 | Repella ........................ | 277/560 |
| 4,516,783 A | * | 5/1985 | Mitsue et al. ................. | 384/482 |
| 4,856,794 A | * | 8/1989 | Boyers et al. ................. | 277/571 |
| 5,042,822 A | * | 8/1991 | Dreschmann et al. ........ | 277/353 |
| 5,129,744 A | * | 7/1992 | Otto et al. .................... | 384/486 |
| 5,186,472 A | | 2/1993 | Romero et al. | |
| 5,553,870 A | * | 9/1996 | Czekansky et al. .......... | 277/559 |
| 5,611,548 A | * | 3/1997 | Dahlhaus ...................... | 277/574 |
| 5,944,321 A | * | 8/1999 | Niebling et al. .............. | 277/549 |
| 6,050,571 A | | 4/2000 | Rieder et al. | |
| 6,168,165 B1 | * | 1/2001 | Sabo ............................ | 277/562 |
| 6,257,587 B1 | * | 7/2001 | Toth et al. .................... | 277/309 |

FOREIGN PATENT DOCUMENTS

| | | | |
|---|---|---|---|
| DE | 38 33 042 A1 | 4/1990 | |
| DE | 4318051 A1 * | 12/1994 | ............ F16J/15/32 |
| DE | 44 38 947 A1 | 5/1996 | |
| DE | 195 39 056 A1 | 11/1996 | |
| DE | 196 16 305 A1 | 10/1997 | |
| DE | 197 40 348 A1 | 3/1999 | |
| DE | 199 50 411 A1 | 7/2000 | |
| DE | 199 14 921 A1 | 10/2000 | |
| DE | 199 38 246 C1 | 4/2001 | |
| EP | 0 807 775 A1 | 11/1997 | |
| JP | 2001-56236 A | 2/2001 | |

* cited by examiner

Primary Examiner—Alison Pickard
Assistant Examiner—Vishal Patel
(74) Attorney, Agent, or Firm—Burns, Doane, Swecker & Mathis LLP

(57) ABSTRACT

A sealing arrangement for sealing a housing with respect to a shaft includes a first annular supporting element connected to the housing, a second annular supporting element connected to the shaft, and a first seal connected to one of the two supporting elements and in abradant contact with the other supporting element. To improve the sealing function of the sealing arrangement, the supporting element to which the first seal is not connected is provided with a second seal which runs frictionally on the machine part to which the first supporting element is connected.

24 Claims, 2 Drawing Sheets

SEALING ARRANGEMENT

This application is based on German Application No. 101 40 837.4 filed on Aug. 21, 2001, the entire content of which is incorporated herein by reference.

FIELD OF THE INVENTION

The invention generally relates to a sealing arrangement. More particularly, the invention pertains to a sealing arrangement for sealing a first machine part, in particular a housing, with respect to a second machine part, in particular a gear or motor shaft. Generally speaking, the sealing arrangement includes a first annular supporting element, preferably is formed with an L-shaped profile, connected to the first machine part, a second annular supporting element, preferably formed with an L-shaped profile, connected to the second machine part, a first seal connected to one of the two supporting elements, preferably to the first supporting element, and which is in abradant contact with the other supporting element, preferably the second supporting element.

BACKGROUND OF THE INVENTION

Sealing arrangements for sealing a first machine part with respect to a second machine part are typically known as cassette seals. By way of example, such a seal is described in European Patent Application No. 0 807 775 A1. With a cassette seal, a particularly simple mounting process of the sealing arrangement is possible.

The performance requirements for sealing arrangements of the type mentioned above are becoming greater and greater. For example, in the area of motor vehicle constructions, the seal is required to reliably seal reliably when a vehicle axle equipped with such a sealing arrangement is temporarily under water. Even in this case, the seal must be impermeable to fluid so that the bearing of the crankshaft bearing assembly continues to be protected.

A need thus exists for a sealing arrangement of the type generally described above which, compared to prior sealing arrangements, has a better capacity to seal against fluid which impinges on the sealing arrangement from one side and has the tendency to flow to the other side of the seal. It would also be desirable to provide such a sealing arrangement which has a particularly good mounting capability.

SUMMARY OF THE INVENTION

According to one aspect, a sealing arrangement includes a first annular supporting element preferably possessing an L-shaped profile and connected to a first machine part, a second annular supporting element preferably possessing an L-shaped profile and connected to a second machine part, and a first seal connected to one of the two supporting elements and in abradant or frictional contact with the other supporting element. In addition, on the supporting element to which the first seal is not connected, a second seal is disposed which extends or runs abradantly or frictionally on the machine part to which the other supporting element is connected.

Preferably, the first machine part is at rest while the second machine part rotates relative to the first machine part. The second seal is preferably formed as a disk. In addition, low-friction movement of the sealing arrangement can be achieved by constructing the second seal so that it consists of polytetrafluoroethylene (PTFE).

The second seal has, in the frictional contact area with the machine part, a contour which is essentially quarter-circular in cross-section. The quarter-circular cross-section of the second seal advantageously forms an opening which is turned or faces away from the supporting element to which the first seal is connected. Thus, fluid which impinges on the sealing arrangement from one side causes a compression effect of the second seal on the machine part on which this seal frictionally extends.

Fluid might nevertheless penetrate in certain cases, and to convey such fluid out of the sealing area, the frictional contact area between the second seal and the machine part on which the second seal runs is provided with spiral grooves. The spiral grooves can be provided at the surface of the seal or the surface of the machine part, with the grooves generating a fluid conveyance upon rotation of the second seal relative to the machine part.

The bonding of the first seal to one supporting element and/or the bonding of the second seal to the other supporting element is preferably accomplished indirectly through use of elastomeric material.

The mounting of the entire sealing arrangement can be simplified by virtue of humps provided on the second seal that extend at least over defined sections of the circumference, with humps being directed in the direction of the other supporting element. Because the second seal is made of a PTFE coating, the humps have PTFE surfaces contacting the other supporting element to thus reduce the friction at this point. If the second seal is made of a material other than PTFE, the humps can be provided with a PTFE coating to reduce friction of the contact with the other supporting element.

The supporting elements can adjoin their respective machine part with a static seal. The static seal can be configured in such a way that the static seal is provided by a number of radially projecting spaced apart rods distributed circumferentially, with the rods running or extending at least generally in the axial direction of the sealing arrangement. The rods can be positioned so that a relatively small angle exists between the longitudinal axes of the rods and the axial direction of the sealing arrangement, with such angle being between 3° and 10°. This configuration leads to the sealing arrangement being easy to mount and having a favorable movement behavior in operation. Advantageously, in the unmounted state of the sealing arrangement, the rods have an inner diameter which is smaller than the outer diameter of the second machine part.

In addition, in the axial end area of the rods, sealing lips encircling the entire circumference can be disposed to improve the static sealing. The mounting can also be improved by one of the supporting elements surrounding, in the manner of a sleeve, one machine part, with a clearance or transition fit being provided between the supporting element and the machine part.

This sealing arrangement provides a very reliable seal which is maintained even under relatively high excess pressure. At the same time, the sealing arrangement can be mounted in a relatively simple manner while at the same time achieving favorable movement behavior during operation.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
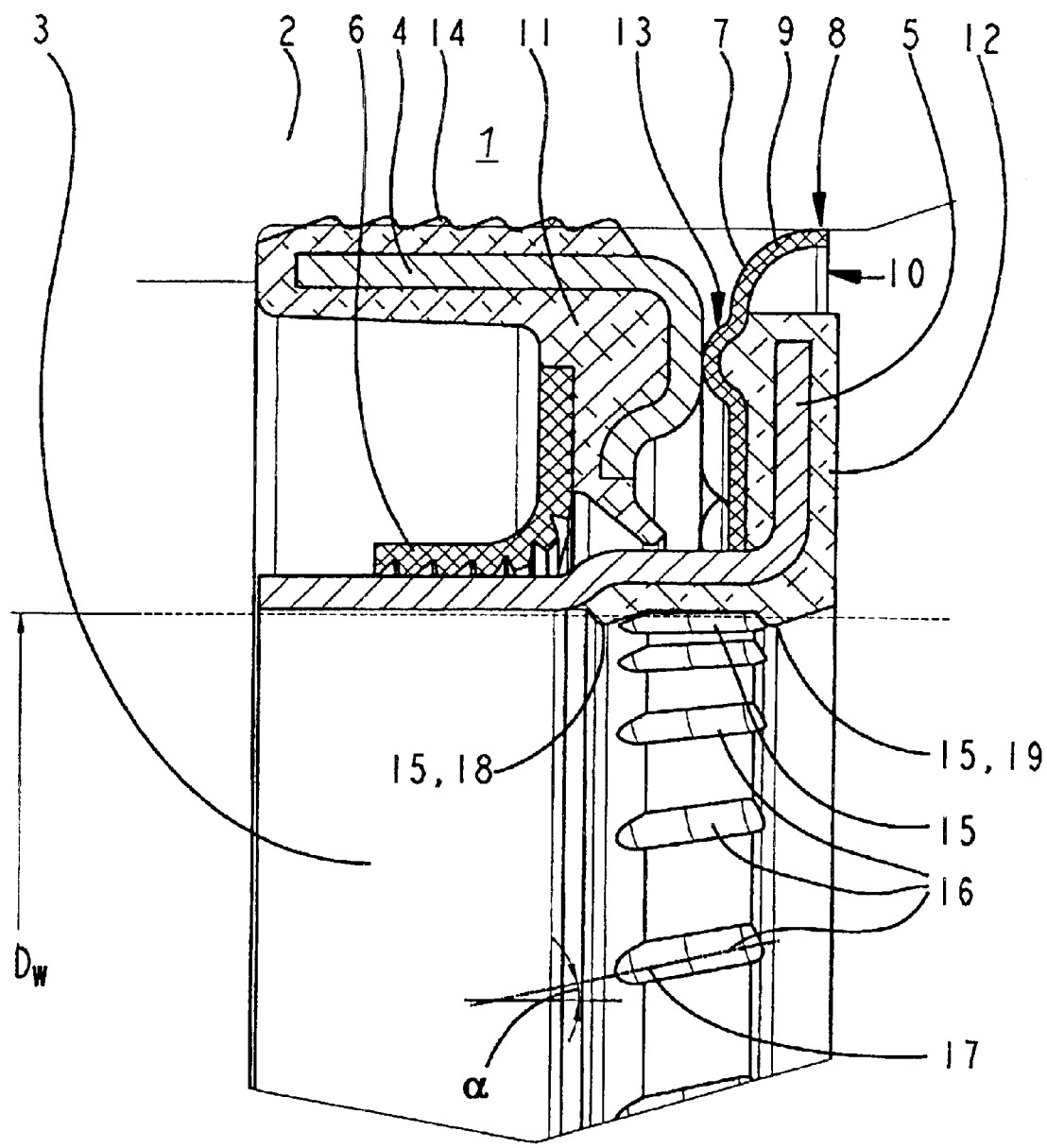
FIG. 1 is a radial cross-sectional view through a sealing arrangement according to an embodiment of the invention.

FIG. 1 illustrates a sealing arrangement 1 which seals a first machine part 2, in this case a housing, from a second machine part 3, in this case a gear or motor shaft. In this embodiment, the first machine part 2 is at rest while the second machine part 3 rotates relative to the first machine part 2. The sealing arrangement 1 is implemented as a cassette seal and includes a first supporting element 4 having an L-shaped profile as seen in FIG. 1 and a second supporting element 5 also having an L-shaped profile as depicted in FIG. 1. The first supporting element 4 is provided as an in-laid metal sheet while the second supporting element 5 is provided as a thrust ring of the seal.

A first seal 6 is bound to the first supporting element 4 via an elastomer material 11. In the mounted state of the sealing arrangement 1, this first seal 6 extends along the end part of the second supporting element 5 to frictionally engage the second supporting element 5. The end part of the second supporting element 5 along which the first seal 6 extends is an axially extending end part configured in the form of a sleeve.

A second seal 7 is disposed on the thrust ring or second supporting element 5 via elastomer material 12. In the illustrated embodiment, this second seal 7 is in the form of a disk and can consist of or be comprised of PTFE material. The second seal 7 extends or runs frictionally in a contact area 8 between the outer surface of the second seal 7 and the inner surface of the housing 2. The second seal 7 thus presses against the housing 2 by virtue of its elastic behavior, thus frictionally contacting the housing 2. The second seal 7 forms a quarter-circular cross-section 9 in this area and has an opening 10. The opening 10 of this quarter-circular section 9 of the second seal 7 is directed or opens away from the first seal 6 and also away from the first supporting element 4 to which the first seal 6 is connected. Thus, with fluid pressure from the right side as seen with reference to FIG. 1, the radially outward-lying end of the second seal 7 is compressed against the housing 2. This thus inhibits or prevents the penetration of fluid in the direction of the first seal 6. If fluid should nevertheless penetrate into the sealing arrangement from the right, a spiral groove (not shown) in the housing 2 or in the radially outward-lying area of the second seal 7 provides a recirculation effect in a known manner.

Figure 2:
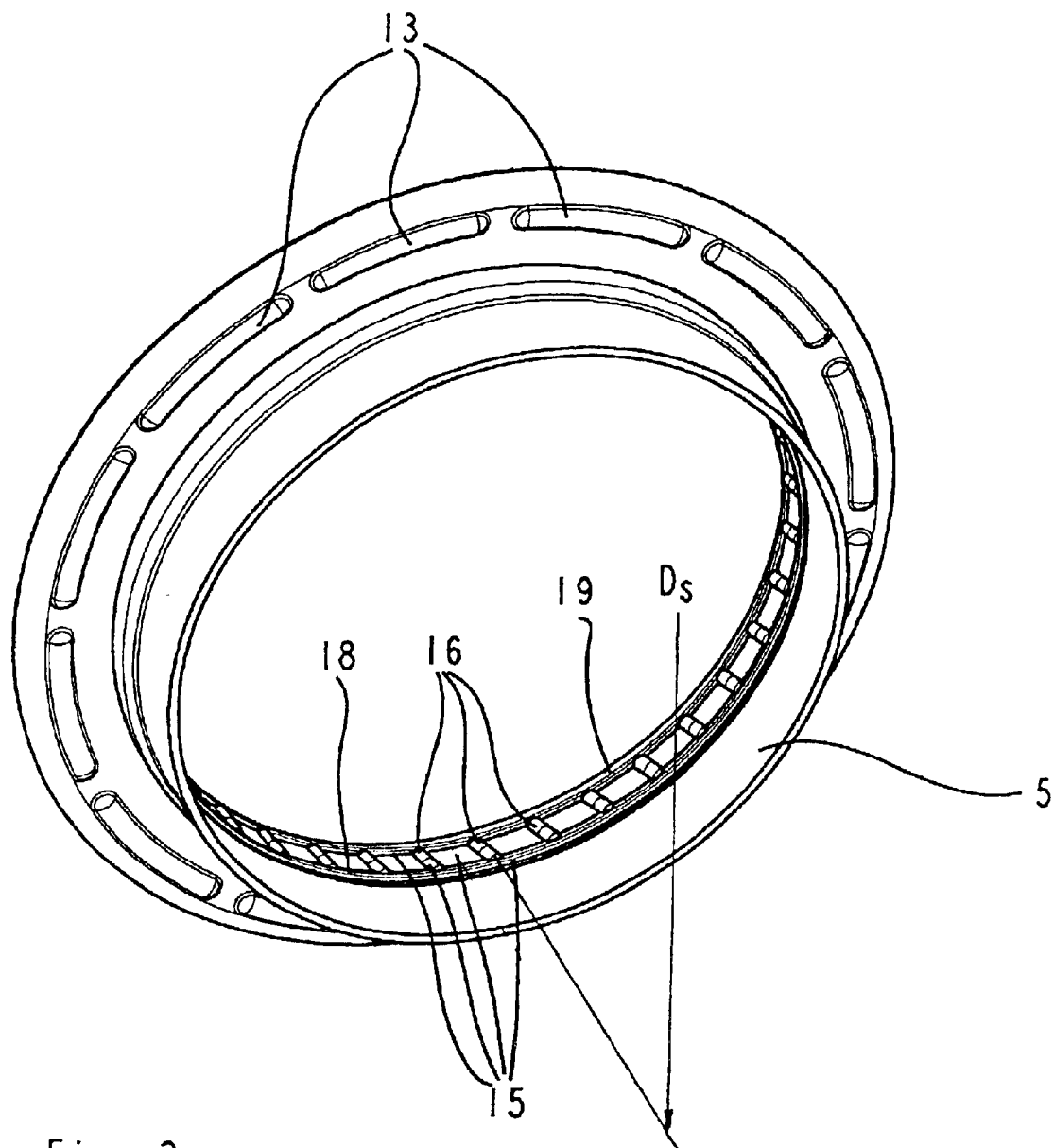
FIG. 2 is a perspective view of a portion of the sealing arrangement illustrating the second supporting element, namely the thrust ring, of the sealing arrangement.

The first supporting element 4 is sealed to the housing 2 via a static seal 14. In a corresponding manner, the second supporting element or thrust ring 5 is sealed to the shaft 3 via a static seal 15. In this disclosed embodiment, the static seal 15 between the thrust ring 5 and the shaft 3 is implemented as follows. As seen particularly with reference to FIG. 2, a plurality of spaced apart rods 16 are distributed over the circumference of the thrust ring 5. In this disclosed embodiment, the rods 16 are distributed equidistantly over the inner circumferential surface of the thrust ring 5. These rods 16 have approximately the form of a half cylinder and thus constitute hemispherically shaped, axially extending protuberances.

The rods project radially inwardly in the direction of the shaft 3 from the inner surface of the thrust ring 5. The inner diameter $D_s$ of the rods 16 in the unmounted state of the sealing arrangement is smaller than the outer diameter $D_w$ of the second machine part or shaft 3. Thus, in the mounted state of the sealing arrangement, the rods 16 sit tightly on the shaft 3 with a prestress. In addition, the longitudinal axes 17 of the rods 16 are set obliquely at a relatively small angle α (an angle other than zero) to the axial direction of the sealing arrangement. In this disclosed embodiment, the angle α between the longitudinal axes of the rods 16 and the longitudinal axis of the sealing arrangement is between 3° and 10°.

As seen with reference to the axial direction, the rods 16 are each bounded on both axial ends by encircling static sealing lips 18, 19 which provide for optimal static sealing.

Through this construction of the sealing arrangement, a variety of results are achieved. For mounting purposes, the entire sealing arrangement 1 can be axially pushed as a unit onto the shaft 3 and into the hole of the housing 2. The second seal 7 is provided with a plurality of circumferentially spaced apart humps 13 which extend axially in the direction of the in-laid metal sheet 4. These humps, which are formed in sections in the circumferential direction so as to be circumferentially spaced apart, press on the in-laid metal sheet 4 forming the first supporting member during mounting so that the entire sealing arrangement 1 can be pushed axially forward into its final position.

As described above, the second seal 7 can be made of PTFE material and so the humps 13 on the second seal 7 present PTFE surfaces contacting the first supporting element 4. As an alternative, it is possible to make the second seal 7 from a material other than PTFE and to provide a PTFE coating on the humps 13. In operation, due to the PTFE surfaces presented at the humps 13, only slight friction on the in-laid metal sheet 4 is present at these regions, which does not have a disturbing effect. Of course, in operation the sealing arrangement 1 strives for a position in which no contact between the humps 13 and the in-laid metal sheet 4 is present for the following reasons. Through the rods 16 disposed at a relatively small angle α, a negligible or small restoring effect is caused in the operation of the sealing arrangement 1, with the restoring effect leading to a minimal movement of the humps 13 off of the in-laid metal sheet 4. The asymmetric profile of the static sealing elements 14, 15 is therefore formed so that the restoring forces from the elastomer material move the humps 13 off of the in-laid metal sheet 4. At this point therefore, no friction or relatively no friction occurs in the operation of the sealing arrangement.

The mounting of the sealing arrangement is otherwise simplified by a clearance or transition fit between the shaft 3 and second supporting element 5. Mounting is also favored by the fact that the flanks of the rods 16 are formed asymmetrically.

With the sealing arrangement described above, retroactive shaft mounting with the use of a cassette seal is possible. The sealing arrangement helps ensure a relatively positionally precise seating of the thrust ring 5 relative to the first seal 6. At the same time, the first seal 6 assumes responsibility for sealing against oil while the second seal 7 serves primarily to keep out dirt and water. Thus the sealing arrangement is particularly well suited for use in the field of motor vehicles, particularly motor vehicles for off-road use.

The second seal 7 is constructed so that media pressure from outside supports the sealing function of the seal against the hole in the housing 2. Media which may penetrate despite this can be conveyed outwards by the centrifugal action of the thrust ring 5 where, particularly preferably by disposition of spiral groves at this point, the media can be removed from the sealing arrangement once again.

As described above, the cross-section of the second seal 7 advantageously forms an opening which faces away from the supporting element to which the first seal 6 is connected so that fluid impinging on the sealing arrangement from one side causes a compression effect of the second seal 7 on the machine part on which this seal frictionally contacts. In certain cases, fluid might nevertheless penetrate. Too convey such fluid out of the sealing area, the frictional contact area between the second seal 7 and the machine part contacted by the second seal is provided with spiral grooves. The spiral grooves, which are known to persons skilled in the art and are thus not shown in the drawing figures, can be provided at the surface of the seal 7 or the surface of the machine part 2, with the grooves generating a fluid conveyance upon rotation of the second seal relative to the machine part.

The principles, preferred embodiment and mode of operation of the present invention have been described in the foregoing specification. However, the invention which is intended to be protected is not to be construed as limited to the particular embodiment disclosed. Further, the embodiments described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A sealing arrangement mounted with respect to a housing and a machine part to seat the housing with respect to the machine part comprising:
   a first annular supporting element having an L-shaped profile and connected to the housing;
   a second annular supporting element having an L-shaped profile and connected to the machine part;
   a first seal connected to the first supporting element, and in frictional contact with the second supporting element;
   a second seal disposed on a radially extending portion of the second supporting element by way of an elastomeric material separate from the second seal, the elastomeric material being between the second seal and the radially extending portion, the second seal extending frictionally on the housing.

2. The sealing arrangement according to claim 1, wherein the housing is at rest and the machine part rotates relative to the housing.

3. The sealing arrangement according to claim 1, wherein the second seal is formed as a disk.

4. The sealing arrangement according to claim 1, wherein the second seal is comprised of PTFE.

5. The sealing arrangement according to claim 1, wherein the second seal frictionally contacts the housing in a friction contact area, the friction contact area of the second seal having a contour that is quarter-circular in cross-section.

6. The sealing arrangement according to claim 5, wherein the quarter-circular cross-section of the second seal forms an opening which faces away from the housing to which the first seal is connected.

7. The sealing arrangement according to claim 1, the first seal is connected to the first supporting element indirectly through an elastomeric material.

8. The sealing arrangement according to claim 1, the second seal is connected to the second supporting element indirectly through the elastomeric material.

9. The sealing arrangement according to claim 1, wherein the second seal includes humps extending over defined circumferential sections of the second seal, the humps being directed toward the first supporting element.

10. The sealing arrangement according to claim 1, wherein the second supporting element adjoins the machine part by a static seal.

11. The sealing arrangement according to claim 10, wherein the static seal includes a plurality of radially inwardly projecting and circumferentially distributed rods provided on the second seal.

12. The sealing arrangement according to claim 11, wherein the rods are arranged so that longitudinal axes of the rods form an angle other than zero with a longitudinal axis of the sealing arrangement.

13. The sealing arrangement according to claim 12, wherein said angle is between 3° and 10°.

14. The sealing arrangement according to claim 11, wherein prior to mounting the sealing arrangement with respect to the machine part the rods have an inner diameter which is smaller than an outside diameter of the machine part.

15. The sealing arrangement according to claim 11, including circumferentially extending sealing lips positioned at axial end areas of the rods.

16. The sealing arrangement according to claim 1, wherein the second supporting element surrounds the machine part with a clearance being provided between the second supporting element and the machine part.

17. A sealing arrangement mounted with respect to a stationary housing and a rotatable shaft to seal the housing with respect to the shaft comprising:
   a supporting element having an L-shaped profile and mounted to the housing;
   a thrust ring having an L-shaped profile and mounted on the shaft;
   a first seal connected to the supporting element and frictionally contacting the thrust ring;
   a second seal disposed on a radially extending portion of the thrust ring by way of an elastomeric material separate from the second seal and frictionally engaged with the housing, the elastomeric material being between the second seal and the radially extending portion.

18. The sealing arrangement according to claim 17, wherein the second seal has an opening facing in a direction away from the first seal.

19. The sealing arrangement according to claim 17, the first seal is connected to the supporting element by way of an elastomeric material.

20. The sealing arrangement according to claim 17, wherein the second seal includes circumferentially spaced apart humps directed towards the supporting element.

21. The sealing arrangement according to claim 17, including a plurality of radially inwardly projecting and circumferentially distributed rods provided on the second seal to form a static seal with the shaft.

22. The sealing arrangement according to claim 21, wherein the rods are arranged so that longitudinal axes of the rods form an angle other than zero with a longitudinal axis of the sealing arrangement.

23. The sealing arrangement according to claim 22, including circumferentially extending sealing lips positioned at axial end areas of the rods.

24. The sealing arrangement according to claim 1, wherein the housing possesses an outer periphery which the second seal frictionally engages, and the first supporting element is sealed to the outer periphery of the housing by a static seal.

* * * * *